No. 777,554. Patented December 13, 1904.

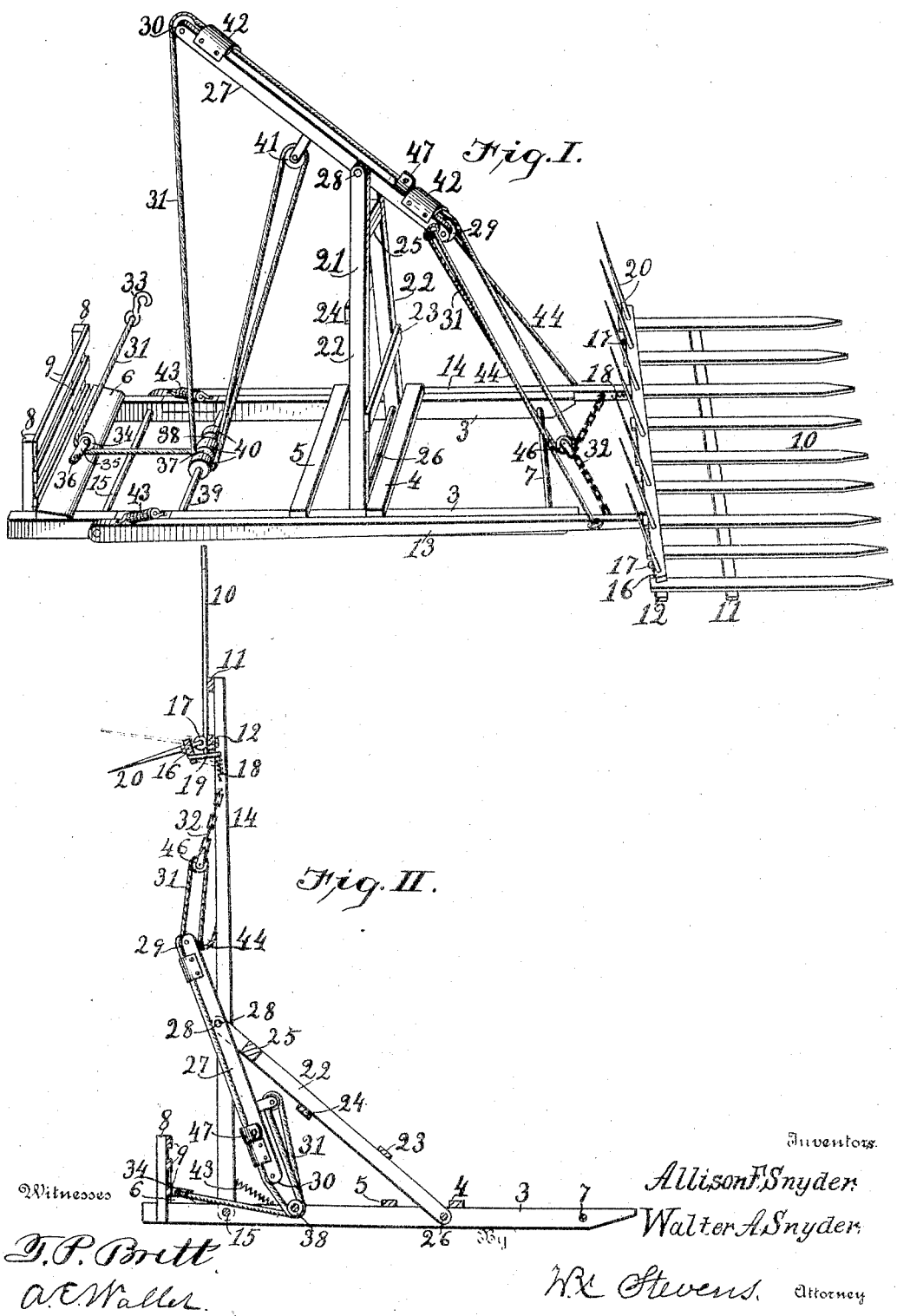

UNITED STATES PATENT OFFICE.

ALLISON F. SNYDER AND WALTER A. SNYDER, OF ALLIANCE, NEBRASKA.

HAY LOADER AND STACKER.

SPECIFICATION forming part of Letters Patent No. 777,554, dated December 13, 1904.

Application filed April 16, 1904. Serial No. 203,502. (No model.)

*To all whom it may concern:*

Be it known that we, ALLISON F. SNYDER and WALTER A. SNYDER, citizens of the United States, residing at Alliance, in the county of Boxbutte and State of Nebraska, have invented a new and useful Improvement in Hay Loaders and Stackers; and we do hereby declare the following to be a full, clear, and exact description of the same.

This invention relates to that class of farming implements which are used for loading and stacking hay; and its object is to provide means whereby the power of a team may be used to raise hay up from the ground and dump it onto a haystack or onto a wagon.

To this end our invention consists in the construction and combination of parts forming a hay stacker and loader hereinafter more fully described, and particularly defined in the claims, reference being had to the accompanying drawings, in which—

Figure I is a perspective view of a hay loader and stacker according to our invention with the fork resting on the ground. Fig. II represents the same in longitudinal vertical section, taken at the near side of the midway pieces and showing the fork elevated to the position of dumping a load.

Numeral 3 represents the side bars of the frame, which rest on the ground and are slanted up at their forward end to be dragged over the field like a sled.

4, 5, 6, and 7 are cross-bars of the frame, rigidly secured to the side bars 3.

A rack comprising two posts 8, which are secured rigidly to the side bars 3 and the cross-slats 9, secured to the posts, serves as a fence to keep loose hay from tumbling onto the bed of the frame.

The fork comprises a series of fingers 10, cross-bars 11 12, side bars 13 14, and the head 16. The fingers 10 are rigidly fixed upon the cross-pieces 11 12, which are fixed upon two side bars 13 and 14. The side bars are mounted to rotate upon a journal 15, located near the rear end of the frame, in being raised to the vertical position shown in Fig. II. The head 16 is provided with fingers 20 and is hinged to the cross-bar 12 in some substantial manner, such as by the eyebolts 17, and it is provided with springs 18, which may be connected with it, each by a short lever 19. The other ends of the springs are connected, respectively, with the side bars 13 14, the action of the springs being to throw the head into the position shown in dotted lines in Fig. II.

21 represents the derrick, comprising two bracing side posts 22 and the cross-bars 23, 24, and 25, rigidly secured thereto. This derrick is mounted to swing backward and forward upon a journal 26, that is fixed in the frame-bars 3 forward of the journal 15 of the hay-fork.

27 is the boom, mounted between the upper ends of the side posts 22 of the derrick to swing upon a short journal 28. The boom is provided with pulleys 29 and 30, over which the draft-rope 31 travels. At one end this rope is attached to the forward end of the boom 27. Thence it passes down around a pulley 46, which is attached to a bail-chain 32, thence back over the pulley 29. The bail-chain 32 is connected directly with the side bars 13 14 of the fork. The rope 31 is provided with a hook 33, to which a horse or other motive power may be hitched to draw it away from pulley 34. This pulley 34 is mounted to revolve in a block 35, that is freely hung at 36 to the cross-bar 6 of the frame, so that the pulley and block may adapt themselves to the direction of pull on the rope.

37 and 38 are pulleys mounted to revolve upon a journal 39, and 40 represents collars to keep the pulleys in place on the rod.

41 is a pulley hung to the under side of the boom 27, nearly midway thereof.

42 represents shields over the rope 31 to prevent it from running off the adjacent pulleys.

47 is a stop-lug clamped upon the rope to strike against the rear shield 42, so that the last action of the rope may be expended upon the boom to draw it close down, as shown in Fig. II, to swing the top of the boom and fork backward in discharging the fork.

43 represents springs, one of which connects each fork-beam 13 and 14 with the adjacent side beam 3 of the frame.

44 represents two ropes independently connecting the forward end of the boom 27 with the side bars 13 14 of the fork. Their action is to bring the boom nearly into line with their points of attachment, so that the boom may lift to the greatest advantage at the instant of starting to raise the loaded fork.

The operation is as follows: The machine is to be located with its rack 8 9 against the side of the stack or wagon to be loaded. Then the fork in the position shown in Fig. I is to be filled with hay. Now if the team be set to pulling at the hook 33 the rope traveling around pulleys 34, 37, 41, 38, 30, and 29 draws, by means of the bail-chain 32, directly upon the side bars 13 14 of the fork to lift it. As soon as the rope becomes taut it will begin to pull the rear end of the boom downward, thus starting the forward end of the boom to lifting the fork and its load by means of the bail-chain 32, aided at this time of greatest strain by the independent ropes 44. As the rear end of the boom 27 approaches near to the pulley 38 its lifting advantage decreases until the line of least resistance to the pulling of the rope is between the forward end of the boom and the fork, so that as the movement of the rope continues it travels around the pulley 46 and the fork is pulled toward the boom and the side ropes 44 hang slack. The lug 47 reaches the rear shield 42 before the shortest distance between the chain 32 and the pulley 29 is gained, and from that time the lower end of the boom is being drawn forward toward the pulley 38 and the top end of the boom is swung rearward, carrying the fork over center. When the fork approaches the vertical position, (shown in Fig. II,) the weight of the load rests largely upon the fork-head 16 20; but the ease with which the fork is swung over the vertical center enables the operator to give the load a throw, if he so desires, at the last moment, and when the load leaves the fork the last portion of it is given a flip by the springs 18, throwing the whole load of hay upon the stack. In passing over center the fork-bars 13 14 draw out the springs 43, and as soon as the load is thrown off from the fork these springs pull the fork forward until its own weight will return it as rapidly as the slackening of the draft-rope permits until it reaches to its normal position of rest, as in Fig. I.

Some of the advantages of this hay loader and stacker are, first, its ability to handle heavy loads with ease; second, its ability to throw the load all upon the stack, and, third, the ease with which its fork returns to its normal position after each lift.

It is evident that all the pulleys are mere well-known devices for changing the direction of the rope and for lessening friction. Therefore they are mentioned in the claims only for the purpose of elucidating the chain of thought, and any equivalent for them may be substituted. It is also evident that the pulleys 41 and 46 might be dispensed with; but that would lessen the leverage and demand more power to work the machine.

Having thus fully described our invention, what we believe to be new, and desire to secure by Letters Patent, is the following:

1. In hay loaders and stackers, a frame to rest upon the ground; a hay-fork having two side bars journaled to the frame near its rear end; a derrick journaled to the frame forward of the hay-fork journal; a boom journaled to the upper end of the derrick; a pulley mounted in the boom at each end thereof and another pulley hung midway of the boom; two pulleys 37, 38, journaled in the frame, another pulley 34, freely hung to the frame; a draft-rope passing over the said pulleys as described, and a bail connecting this rope with the two side bars of the hay-fork.

2. In hay loaders and stackers, a frame; a hay-fork journaled thereto; a derrick journaled in the frame; a boom journaled in the derrick; pulleys secured to the derrick and the frame; a draft-rope running over the pulleys and connected with the hay-fork, and connections between the hay-fork and the derrick independent of the draft-rope, whereby the first lift upon the fork is made by the action of the draft-rope through the boom, and the lift is finished by direct pulling of the rope substantially as described.

3. In hay loaders and stackers, a frame; a hay-fork journaled to swing up and down thereon; a head to the fork, provided with teeth and hinged to swing to and fro on the fork, and springs connecting the head with the fork.

4. In hay loaders and stackers, a frame; a hay-fork journaled thereon, to swing upward and rearward; a derrick attached to the frame; a boom journaled on the derrick; rope-shields upon the boom; a rope connected with the fork and mounted to travel longitudinally over the boom, and a lug secured to the rope to engage the said shields substantially as shown and described.

In testimony whereof we affix our signatures in presence of two witnesses.

ALLISON F. SNYDER.
    WALTER A. SNYDER.

Witnesses:
 W. S. ACHISON,
 J. E. JODER.